(12) United States Patent
Chuang et al.

(10) Patent No.: US 9,986,247 B2
(45) Date of Patent: *May 29, 2018

(54) METHOD AND APPARATUS FOR LINE BUFFER REDUCTION FOR VIDEO PROCESSING

(71) Applicant: HFI Innovation Inc., Zhubei, Hsinchu County (TW)

(72) Inventors: Tzu-Der Chuang, Zhubei (TW); Yu-Wen Huang, Taipei (TW); Ching-Yeh Chen, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 268 days.

This patent is subject to a terminal disclaimer.

(21) Appl. No.: 14/836,140

(22) Filed: Aug. 26, 2015

(65) Prior Publication Data

US 2015/0365680 A1     Dec. 17, 2015

Related U.S. Application Data

(63) Continuation of application No. 13/985,282, filed as application No. PCT/CN2012/074524 on Apr. 23, 2012, now Pat. No. 9,762,918.
(Continued)

(51) Int. Cl.
*H04N 19/176*     (2014.01)
*H04N 19/102*     (2014.01)
(Continued)

(52) U.S. Cl.
CPC ......... *H04N 19/176* (2014.11); *H04N 19/102* (2014.11); *H04N 19/13* (2014.11);
(Continued)

(58) Field of Classification Search
CPC .... H04N 19/102; H04N 19/13; H04N 19/159; H04N 19/167; H04N 19/176; H04N 19/463; H04N 19/91
See application file for complete search history.

(56) References Cited

U.S. PATENT DOCUMENTS 7,262,721 B2    8/2007    Jeon et al.
2006/0013320 A1    1/2006    Oguz et al.
(Continued)

FOREIGN PATENT DOCUMENTS

CN     1980395     6/2007
CN     101076114     11/2007
(Continued)

OTHER PUBLICATIONS

Francois, E., et al.; "Storage Reduction in Dependent Tiles;" Joint Collaborative Team on Video Coding (JCT-VC) of TU-T SG16 WP3 and ISO/IEC JTC1/SC29/WG11; Feb. 2012; pp. 1-4.
(Continued)

*Primary Examiner* — Peter D Le
(74) *Attorney, Agent, or Firm* — McClure, Qualey & Rodack, LLP

(57) ABSTRACT

A method and apparatus of line buffer reduction for context adaptive entropy processing are disclosed. The context formation for context adaptive entropy processing depends on block information associated with one or more neighboring blocks. When a first neighboring block is on an upper side of a horizontal region boundary or on a left side of a vertical region boundary of the region, the block information is replaced by replacement block information to reduce or remove line buffer requirement for storing the block information of neighboring blocks on the other side of the region boundaries from the current block. The context adaptive
(Continued)

entropy processing is CABAC encoding, CABAC decoding, CAVLC encoding, or CAVLC decoding.

19 Claims, 7 Drawing Sheets

Related U.S. Application Data

(60) Provisional application No. 61/533,895, filed on Sep. 13, 2011, provisional application No. 61/490,805, filed on May 27, 2011.

(51) Int. Cl.
    *H04N 19/463*     (2014.01)
    *H04N 19/91*     (2014.01)
    *H04N 19/13*     (2014.01)
    *H04N 19/159*     (2014.01)
    *H04N 19/167*     (2014.01)

(52) U.S. Cl.
    CPC ......... *H04N 19/159* (2014.11); *H04N 19/167* (2014.11); *H04N 19/463* (2014.11); *H04N 19/91* (2014.11)

(56) References Cited

U.S. PATENT DOCUMENTS

| | | |
|---|---|---|
| 2007/0183491 A1 | 8/2007 | Pearson et al. |
| 2010/0158130 A1 | 6/2010 | Chen et al. |
| 2011/0243226 A1 | 10/2011 | Choi et al. |
| 2012/0014431 A1 | 1/2012 | Zhao et al. |
| 2012/0014437 A1 | 1/2012 | Segall et al. |
| 2012/0099654 A1 | 4/2012 | Chen et al. |
| 2016/0065966 A1 | 3/2016 | Yu |

FOREIGN PATENT DOCUMENTS

| | | |
|---|---|---|
| CN | 101099391 | 1/2008 |
| CN | 101115201 | 1/2008 |
| CN | 101267559 | 9/2008 |
| CN | 101578877 | 11/2009 |
| CN | 101765016 | 6/2010 |
| KR | 20060082199 | 7/2006 |

OTHER PUBLICATIONS

European Search Report dated Jul. 23, 2014, issued in application No. EP 12792295.

Zhao, J., et al.; Parallel Entropy Decoding for High-Resolution Video Coding; Visual Communications and Image Processing; Jan. 2009.

Chuang, T.D., et al.; "CE1.A.3: Reducing Line Buffers for CABAC;" Joint Collaborative Team on Video Coding of ISO/IEC JTC1/SC29/WG11 and ITU-T SG16; Nov. 2011.

Lee, T., et al.; "On Line Buffer Removal for CU Split Flag and Skip Flag Context Model;" Joint Collaborative Team on Video Coding of ISO/IEC JTC1/SC29/WG11 and ITU-T SG16; Nov. 2011.

ived at the decoder side without side information or with minimum side information. The correlation among an underlying block and neighboring blocks may be utilized to improve the coding efficiency of Entropy Coding (EC). To exploit the correlation among the underlying block and neighboring blocks, context-based adaptive entropy coding (also called context adaptive entropy coding) has been used extensively in newer video coding systems such as H.264 and the emerging High Efficiency Video Coding (HEVC) system. There are two types of EC modes. One mode is Context-based Adaptive Binary Arithmetic Coding (CABAC), and the other mode is Context-based Adaptive Variable Length Coding (CAVLC). In both CABAC and CAVLC, information from neighboring blocks is often used as contexts for entropy coding a syntax element of the current block.

METHOD AND APPARATUS FOR LINE BUFFER REDUCTION FOR VIDEO PROCESSING

CROSS REFERENCE TO RELATED APPLICATIONS

The present invention is a continuation of U.S. patent application Ser. No. 13/985,282, filed on Aug. 13, 2013, which claims priority to PCT Patent Application No. PCT/CN2012/074524, filed on Apr. 23, 2012, which further claims priority to U.S. Provisional Patent Application Ser. No. 61/490,805, filed May 27, 2011 and U.S. Provisional Patent Application Ser. No. 61/533,895, filed Sep. 13, 2011. The U.S. Patent Application, PCT Patent Application and U.S. Provisional Patent Applications are hereby incorporated by reference in their entireties.

FIELD OF THE INVENTION

The present invention relates to video coding or video processing. In particular, the present invention relates to reduction of line buffer requirement, where the entropy decoding of a current block is dependent on one or more neighboring blocks.

BACKGROUND

In video coding, block information of neighboring blocks are usually utilized to predict syntax elements, such as motion data, of a current block. The neighboring blocks usually correspond to blocks previously processed so that the information of the neighboring blocks can be derived at the decoder side without side information or with minimum side information. The correlation among an underlying block and neighboring blocks may be utilized to improve the coding efficiency of Entropy Coding (EC). To exploit the correlation among the underlying block and neighboring blocks, context-based adaptive entropy coding (also called context adaptive entropy coding) has been used extensively in newer video coding systems such as H.264 and the emerging High Efficiency Video Coding (HEVC) system. There are two types of EC modes. One mode is Context-based Adaptive Binary Arithmetic Coding (CABAC), and the other mode is Context-based Adaptive Variable Length Coding (CAVLC). In both CABAC and CAVLC, information from neighboring blocks is often used as contexts for entropy coding a syntax element of the current block.

The neighboring blocks may be these blocks on the upper side and/or left side of the current block. When the blocks in a picture are processed in a raster scan order, a line buffer may be required to store information associated with blocks in a previous row. For example, a processing unit used in HEVC Test Model version 3.0 (HM-3.0) may correspond to a Coding Unit (CU), a Prediction Unit (PU), a Transform Unit (TU), or a Largest CU (LCU). In the case of CAVLC coding of motion vector difference (MVD) of the current block, it requires the MVs of the left block and the upper block for context formation. Therefore, the information associated with motion vectors for the blocks in a previous row of LCUs has to be buffered if the processing order is LCU row by LCU row. In HEVC, CABAC and CAVLC are used to encode various syntax elements associated with the blocks. The line buffer size may be very large, especially for large-size pictures. Therefore, it is desirable to develop method and apparatus to reduce the line buffer requirement for neighboring-block-dependent processing such as CABAC and CAVLC.

BRIEF SUMMARY OF THE INVENTION

A method and apparatus of line buffer reduction for context adaptive entropy decoding are disclosed. According to one embodiment of the present invention, the method comprises determining context for parsing a syntax element of a current block in a region depending on block information associated with one or more neighboring blocks, wherein the region corresponds to one or more rows of largest coding units (LCUs); replacing the block information associated with a first neighboring block by replacement block information if the first neighboring block is on an upper side of a horizontal region boundary or on a left side of a vertical region boundary of the region; and performing context adaptive entropy decoding of the syntax element based on the context. The context adaptive entropy decoding can be CABAC (context adaptive binary arithmetic code) decoding or CAVLC (context adaptive variable length code) decoding. The syntax element may corresponds to luma intra mode significant flag, last significant flag, coefficient greater than one or coefficient magnitude minus one. The block information may include the syntax element to be processed by the context adaptive entropy decoding. The neighboring block corresponds to an above-left block, an above block, or an above-right block of the current block. The replacement block information may correspond to a pre-defined value, a user-defined value, a value that marked as unavailable, or the block information of a previously processed block in the region. When the syntax element corresponds to the luma intra mode, the replacement block information corresponds to DC mode or Planar mode.

DETAILED DESCRIPTION OF THE INVENTION

Figure 1A:
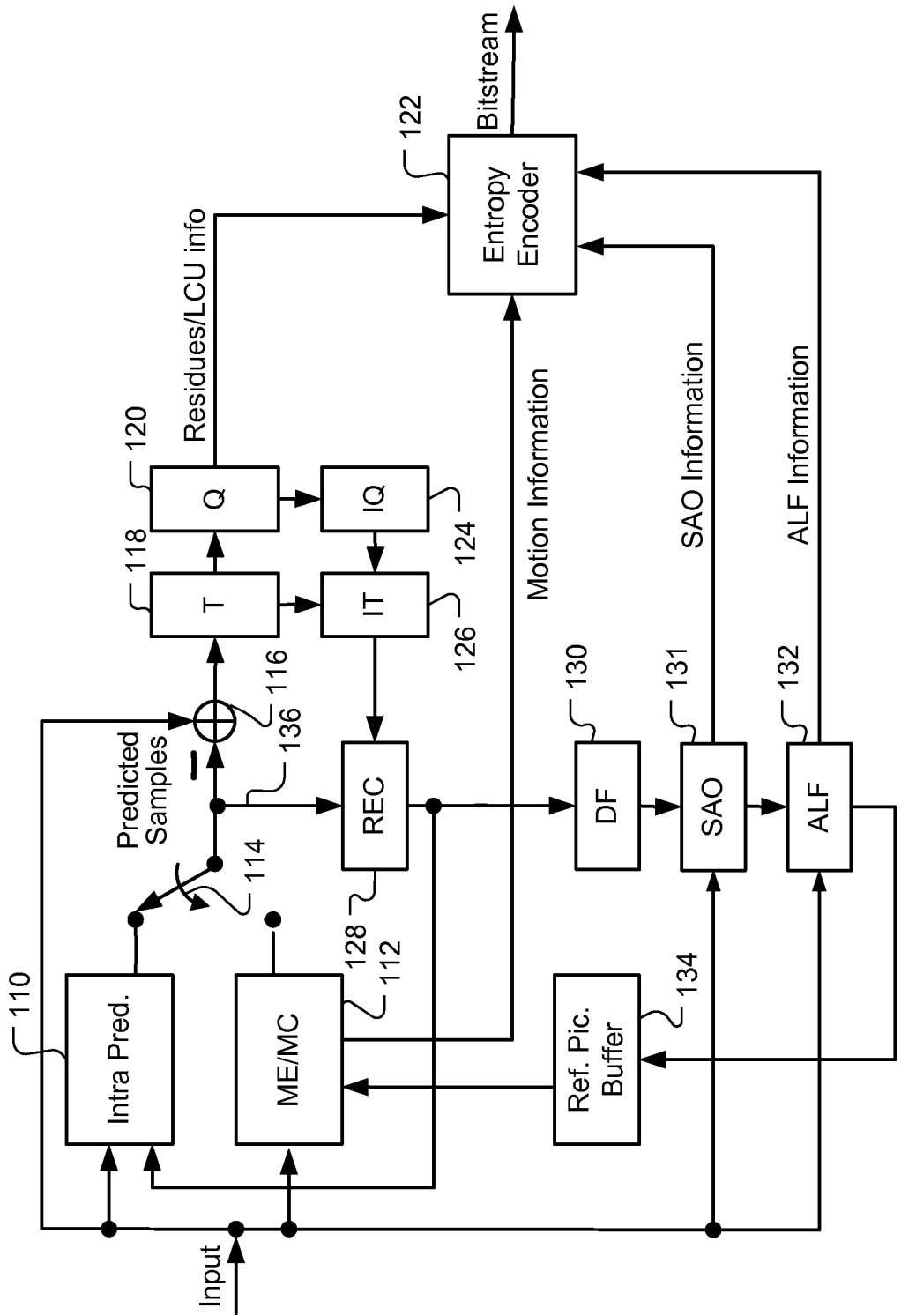
FIG. 1A illustrates an exemplary adaptive inter/intra video encoding system with DF, SAO and ALF in-loop processing.

FIG. 1A illustrates an exemplary adaptive inter/intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the video data. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

Figure 1B:
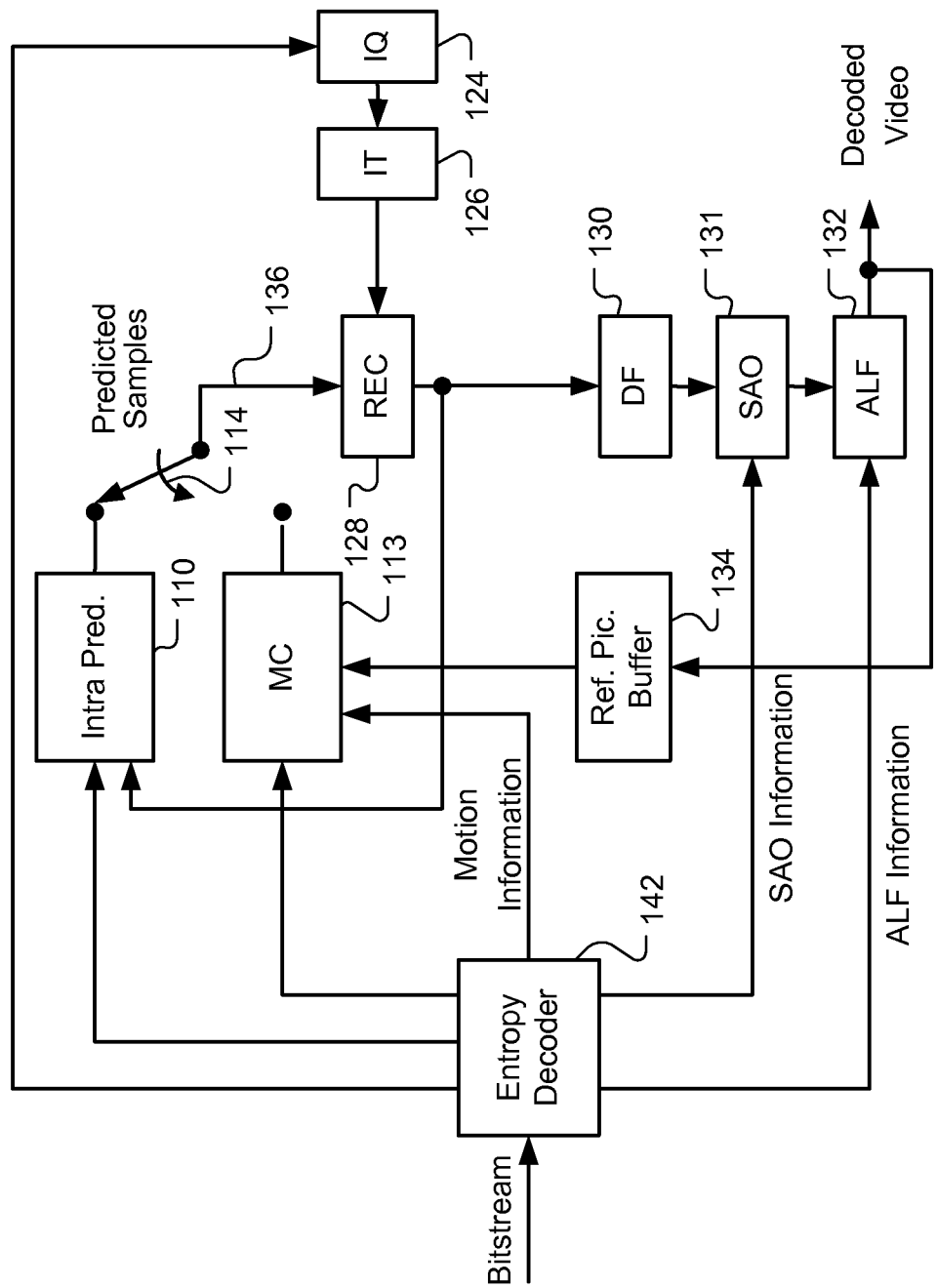
FIG. 1B illustrates an exemplary adaptive inter/intra video decoding system with DF, SAO and ALF in-loop processing.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

Entropy Encoder 122 in FIG. 1A and Entropy Decoder 142 in FIG. 1B support CABAC and/or CAVLC for various syntax elements used in the coding system. Beside residual information, associated side information such as motion information, SAO information and ALF information are also incorporated in the bitstream. In order to represent the side information efficiently, the side information is also processed using CABAC or CAVLC as shown in FIG. 1A and FIG. 1B.

Figure 2:
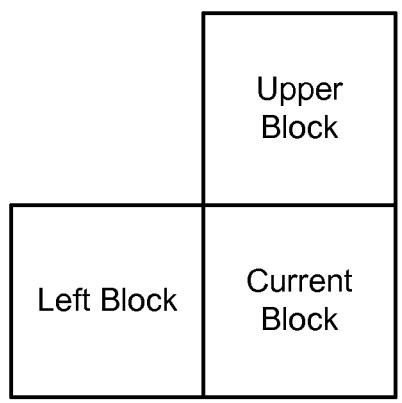
FIG. 2 illustrates an example of context-based syntax element processing using block information associated with two neighboring blocks.

FIG. 2 illustrates an exemplary context adaptive processing of a current block based on two neighboring blocks corresponding to CABAC coding of motion vector difference (MVD) of HEVC Test Model version 3.0 (HM-3.0). The motion vector difference (MVD) of the current block is processed by CABAC and the context formation requires the MVDs of the left block and the upper block for context formation. Since the LCUs are processed in a raster scan order, the buffer for storing left block information is very small and can be easily implemented as on-chip memory, which will not increase any external memory access. However, for upper block information, line buffers whose sizes are proportional to the picture width are required to store information from the upper LCU row. If on-chip line buffers are used, the chip area and cost will be significantly increased. If line buffers are implemented as external memory, the external memory bandwidth will be significantly increased. Therefore, it is desirable to design video encoding and decoding algorithms with reduced line buffer requirements. While an above block (i.e., the upper block) from the upper LCU row is used, an above-left or an above-right block may also be used.

In the above example, the context of CABAC is based on the MVDs of the left block and the upper block as shown in FIG. 2. The information that is used to form context may include split_flag, skip_flag, motion information, coding mode, inter prediction direction, reference index, luma intra mode, chroma intra mode, and partition information. Table 1 illustrates examples of CABAC/CAVLC coding for various syntax elements and the required information to be stored in line buffers. For example, when the split flag is entropy coded using CABAC, the depth information of the neighboring blocks has to be stored in line buffers for the next LCU row. In another example, when the merge index is entropy coded using either CABAC or CAVLC, both MV and reference index of the neighboring blocks have to be stored in line buffers for the next LCU row. As shown in Table 1, the context stored in the line buffers includes syntax elements to be processed by CABAC or CAVLC as well as other block information that may not processed by CABAC or CAVLC.

While Table 1 illustrates some exemplary syntax elements to be processed by CABAC or CAVLC, other syntax elements may also be processed by CABAC or CAVLC. Other syntax elements to be processed by CABAC or CAVLC include partition size, prediction mode, motion vector difference, delta quantization parameter, significant flag, last significant flag, coefficient greater than one, coefficient-magnitude-minus-one, Adaptive Loop Filter (ALF) control flag, ALF flag, ALF filter length, ALF filter coefficients, Sample Adaptive Offset (SAO) flag, SAO filter length, SAO filter coefficients, transform subdivision flags, residual quad-tree Coded Block Flag (CBF), and residual quad-tree root CBF, may also be processed using CABAC or CAVLC. As is noted in Table 1, the information to be stored in the line buffers may be significant. It is desirable to reduce or remove the line buffer requirement.

TABLE 1

| Entropy Coder | Syntax Element | Line Buffer |
| --- | --- | --- |
| CABAC | split flag | depth information |
| CABAC | skip flag | leaf-CU skip flag |
| CABAC | merge flag | PU skip flag |
| CABAC | merge index | PU MV, reference index |
| CABAC | chroma intra mode | chroma mode |
| CABAC | luma intra mode | luma intra mode |
| CABAC | inter prediction direction | inter prediction direction |

TABLE 1-continued

| Entropy Coder | Syntax Element | Line Buffer |
|---|---|---|
| CABAC | motion vector difference | threshold of MVD |
| CABAC | motion vector predictor index | MV |
| CABAC | reference index | reference index |
| CABAC | residual quad-tree CBF | residual quad-tree CBF |
| CABAC | residual quad-tree root CBF | residual quad-tree root CBF |
| CAVLC | merge index | PU MV, reference index |
| CAVLC | luma intra mode | luma intra mode |
| CAVLC | inter prediction direction | inter prediction direction |
| CAVLC | reference index | reference index |
| CAVLC | motion vector predictor index | MV |

Figure 3:
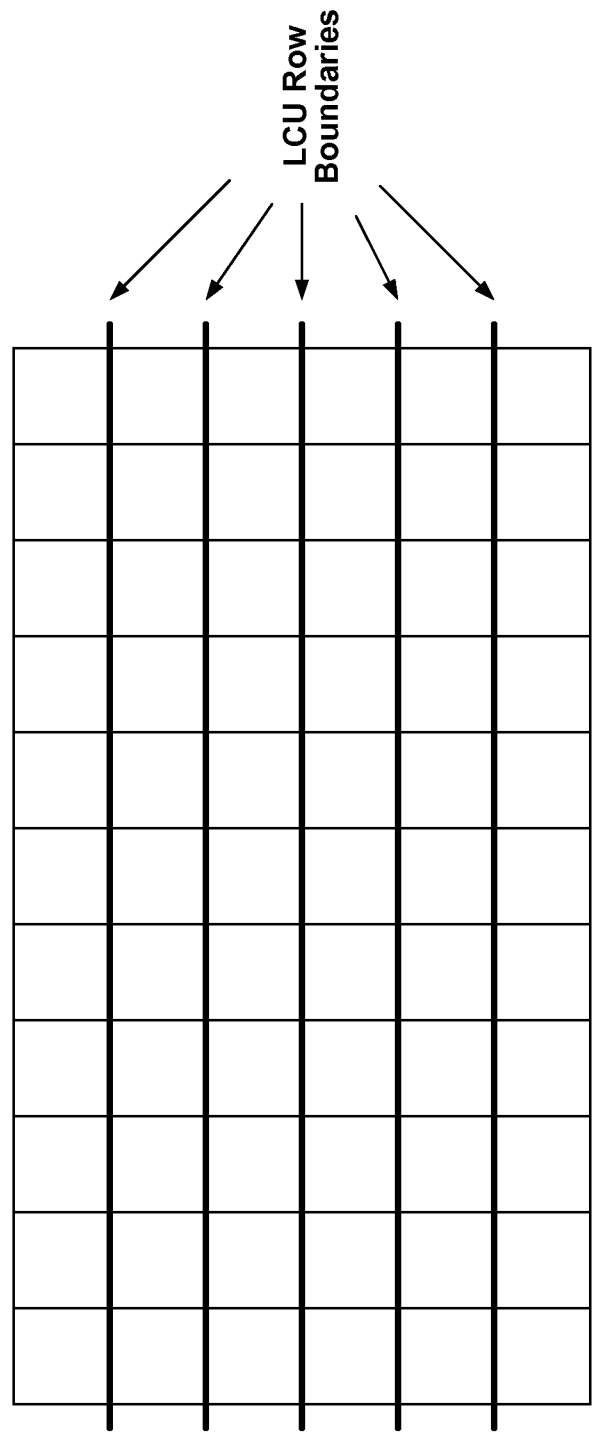
FIG. 3 illustrates an example of line buffer requirement related to LCU row boundaries for context-based entropy coding.

The block used for video processing may be a Prediction Unit (PU) used for motion prediction, a Transform Unit (TU) for transform process, a Coding Unit (CU), a Largest CU (LCU), or other block structure. Very often, an HEVC-based video coding system processes an underlying picture on an LCU basis and the LCUs in a picture are processed in raster scan order, i.e., row by row and from top to the bottom of the picture. Due to the dependence of a current block on its neighboring blocks related to context formation for CABAC or CAVLC, information from a previous LCU may have to be stored. FIG. 3 illustrates the LCU row boundaries of a picture, where each square corresponds to an LCU. The LCU may be adaptively partitioned into smaller processing units such as CUs. For the blocks immediately below an LCU boundary, context based processing of the syntax element of a current block may require information associated with blocks above the respective LCU boundary. Therefore, line buffers will be required to store information associated with blocks above the respective LCU boundary. The line buffer requirement grows linearly with the picture width. For wide picture, the storage requirement may become significant.

Figure 4:
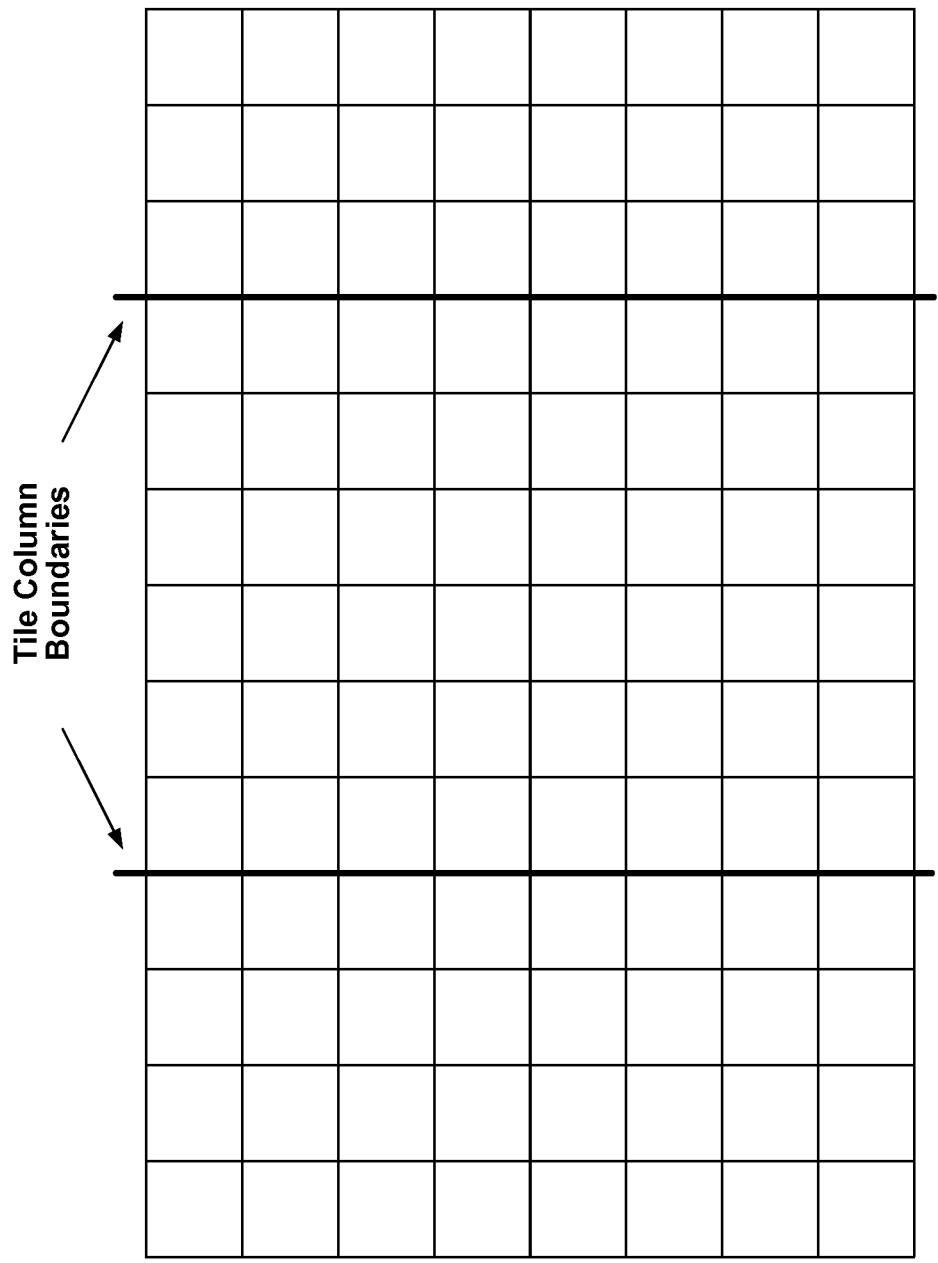
FIG. 4 illustrates an example of column buffer requirement related to tile column boundaries for context-based entropy coding.

While a picture may be divided into LCUs and processed LCU row by LCU row as shown in FIG. 3, a picture may also be divided into vertical tiles as shown in FIG. 4, where each square represents an LCU. The picture is processed tile by tile from left to right. Due to the dependence of a current block on its neighboring blocks related to context formation for CABAC or CAVLC, information from a previous tile may have to be stored if the context information for a block at the vertical tile boundary requires information from the left block. Therefore, column buffers are used and the size of the buffer is proportional to the picture height. A column buffer may be considered as a vertical line buffer. Consequently, the line buffer may also refer to a column buffer in this disclosure.

Figure 5:
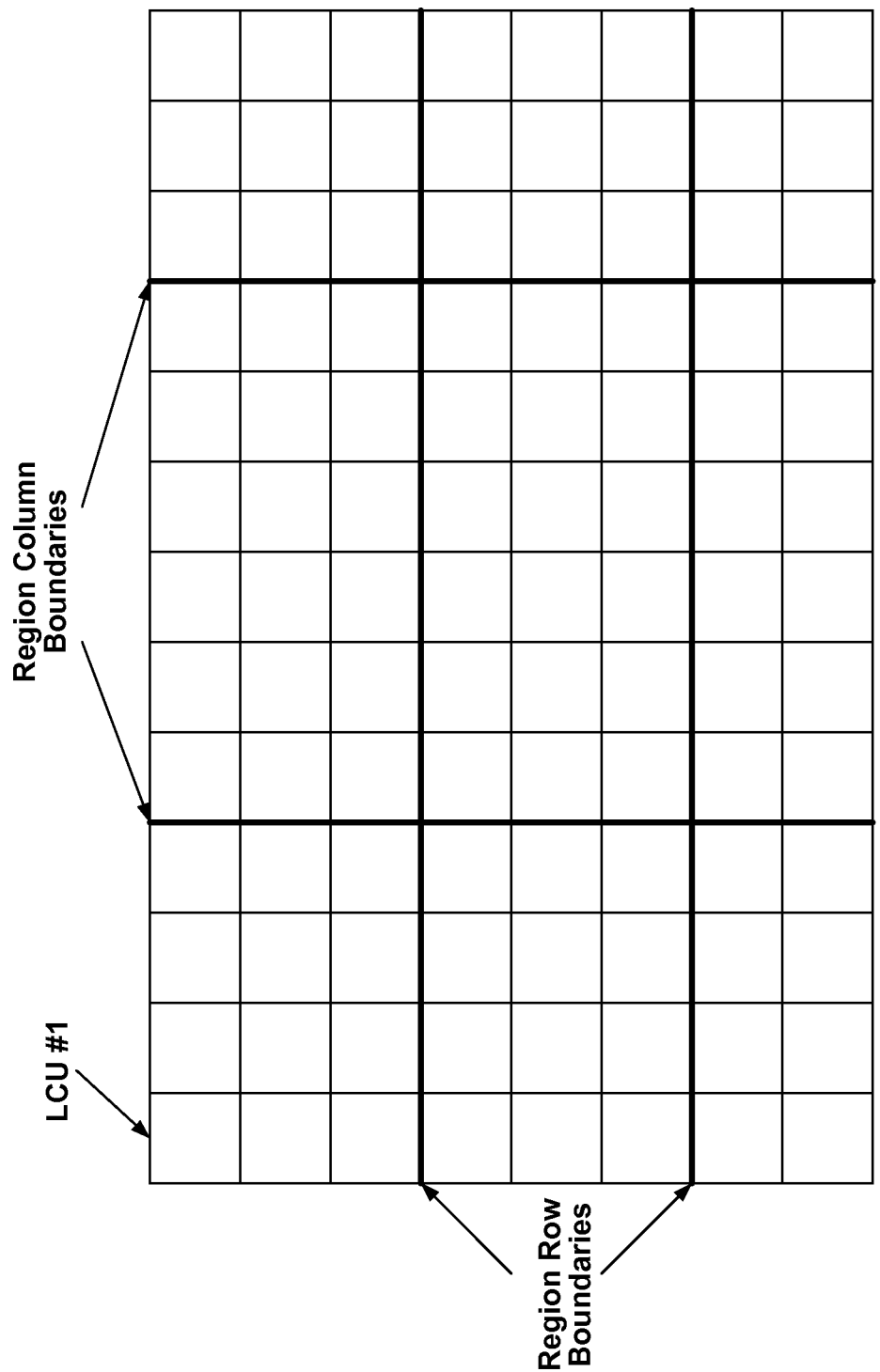
FIG. 5 illustrates an example of line buffer requirement related to region row boundaries and column buffer requirement related to region column boundaries for context-based entropy coding.

A picture may also be processed region by region where the picture is partitioned into regions. Each region may consist of M×N blocks, CUs or LCUs. The regions can be processed according to the raster scan order. Alternatively, the regions may be scanned column by column and from left to right. In an extreme case, N is equal to the number of LCUs in picture height. In other words, a region may correspond to a tile. In another extreme case, M is equal to the number of LCUs in picture width. In other words, a region may correspond to one or more LCU rows. FIG. 5 illustrates an example of region partition of a picture where each square is an LCU and the region size varies through the picture. For region based processing, column buffers (i.e., vertical line buffers) will be required, where the column buffer size is proportional to the vertical region size. Furthermore, line buffers may also be required in addition to column buffer. As mentioned earlier, the term line buffer may refer to horizontal line buffer and/or vertical line buffer. Also it is understood that the line size is not necessarily referring to the picture width.

In order to remove line buffer requirement, an embodiment according to the present invention modifies the context formation for LCU row by LCU row based processing when the upper block is not in the current LCU row. If the upper block does not belong to the current LCU row, the information associated with the upper block is not used for the context formation. In this case, the upper block may be treated as unavailable or may be replaced by any other causal block in the current LCU row. A causal block is a previously processed block. Accordingly, no line buffer is needed for CABAC or CAVLC. For example, the luma intra mode coding/decoding using CABAC/CAVLC in HEVC requires the luma intra mode of upper block and luma intra mode of left block, as shown in FIG. 2. An embodiment according to the present invention will treat the upper block as unavailable if the upper block is not in the current LCU row. If the value for an upper block is not available, a pre-defined value or a user defined value may be used. For example, in the case of CABAC coding for the intra luma prediction mode, DC mode or Planar mode may be used as the pre-defined mode for the upper block above the LCU row boundary. Other pre-defined intra luma mode may also be used.

Similarly, for the tile-based processing shown FIG. 4, CABAC or CAVLC processing of a to-be-processed unit (e.g. CU or PU or TU) of one tile according to the present invention will not use any data from a left tile for context formation. If the left block does not belong to the current tile, the information associated with the left block is not used for the context formation. In this case, the left block may be treated as unavailable or may be replaced by any other causal block in the current LCU row. Accordingly, no column buffer (i.e., vertical line buffer) is needed for CABAC or CAVLC. For example, the luma intra mode coding/decoding using CABAC/CAVLC in HEVC requires the luma intra mode of upper block and luma intra mode of left block, as shown in FIG. 2. An embodiment according to the present invention will treat the left block as unavailable if the left block is not in the current tile. If the value for a left block is not available, a pre-defined value or a user-defined value may be used. For example, in the case of CABAC coding for the intra luma prediction mode, DC mode or Planar mode may be used as the pre-defined mode for the left block on the left side of a tile boundary. Other intra luma mode may also be used.

When a picture is partitioned into regions, line buffers for both vertical region boundaries and horizontal region boundaries may be required. The embodiments of the present invention disclosed earlier for removing the line buffers associated with the horizontal LCU row and the line buffer associated with the vertical tile boundaries can be applied to region-based CABAC and CAVLC processing to remove the line buffer requirement.

Figure 6:
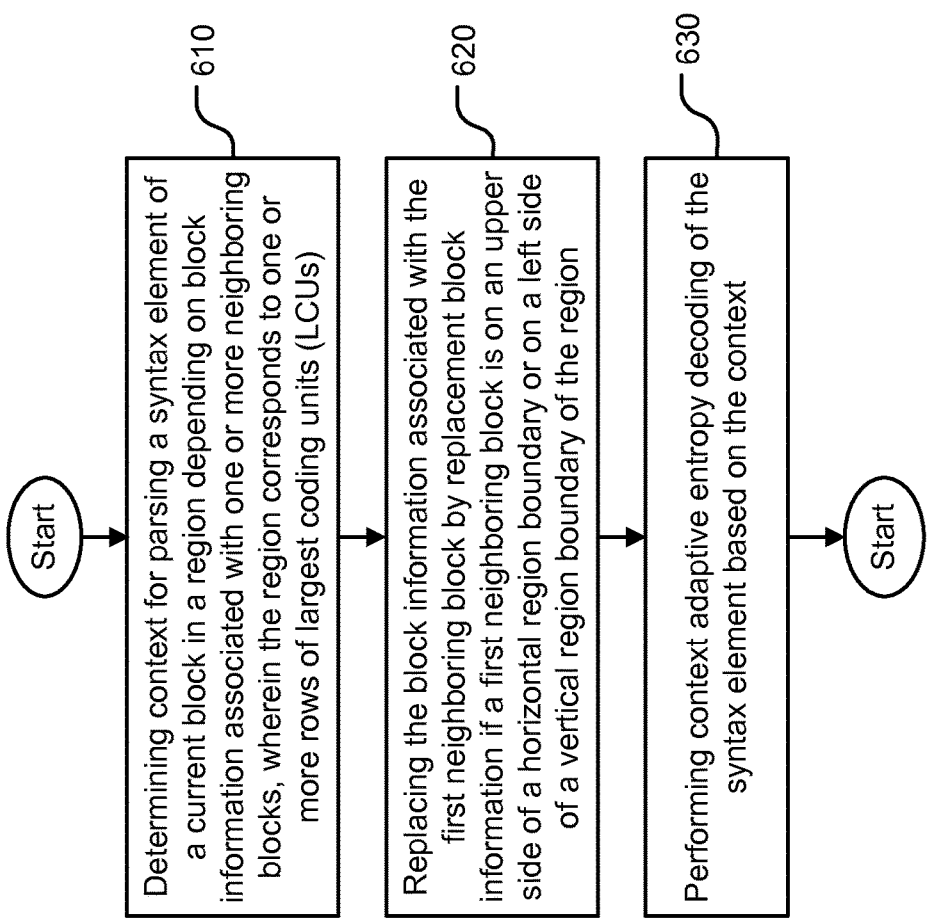
FIG. 6 illustrates an exemplary flowchart for removing line buffer requirement related to region boundaries for context-based entropy decoding.

FIG. 6 illustrates an exemplary flowchart for removing line buffer requirement related to region boundaries for context-based entropy decoding according to an embodiment of the present invention. The context for parsing a syntax element of a current block in a region depending on block information associated with one or more neighboring blocks is determined in step 610, wherein the region corresponds to one or more rows of largest coding units (LCUs). If a first neighboring block is on an upper side of a horizontal region boundary or on a left side of a vertical region boundary of the region, the block information associated with the first neighboring block is replaced by replacement block information in step 620. The context adaptive entropy decoding of the syntax element can be performed based on the context as shown in step 630. The flowchart in FIG. 6 illustrates an example of line buffer reduction according to an embodiment of the present invention. A skilled person may practice the present invention by re-arranging the steps and/or modifying individual steps to achieve the same effect.

Embodiment of line buffer reduction for context adaptive entropy processing according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for context adaptive entropy decoding, the method comprising:
   receiving coded data associated with a current block in a region, wherein the region corresponds to one or more rows of largest coding units (LCUs) and the coded data comprises a syntax element associated with a current luma intra mode of the current block;
   if a neighboring block of the current block is on an upper side of a horizontal boundary of the region or on a left side of a vertical boundary of the region, replacing block information associated with the neighboring block by DC mode;
   determining information for parsing the syntax element based on the block information associated with the neighboring blocks; and
   performing context adaptive entropy decoding of the syntax element based on the determined information.

2. The method of claim 1, wherein the context adaptive entropy decoding corresponds to CABAC (context adaptive binary arithmetic coding) decoding or CAVLC (context adaptive variable length coding) decoding.

3. The method of claim 1, wherein the syntax element corresponds to luma intra mode, significant flag, last significant flag, coefficient greater than one, or coefficient magnitude minus one.

4. The method of claim 3, wherein the replacement block information corresponds to DC mode or Planar mode when the syntax element corresponds to the luma intra mode.

5. The method of claim 1, wherein the replacement block information corresponds to a pre-defined value, a user-defined value, a value that marked as unavailable, or the block information of a previously processed block in the region.

6. The method of claim 5, wherein the previously processed block is a left block or a lower-left block of the current block.

7. The method of claim 1, wherein the block information includes the syntax element to be processed by the context adaptive entropy decoding.

8. The method of claim 1 wherein said one or more neighboring blocks correspond to one or more blocks selected from a group consisting of an above-left block, an above block, an above-right block, a left block and an above left block of the current block.

9. The method of claim 1, wherein said one or more neighboring blocks correspond to an above block and a left block of the current block.

10. An apparatus for context adaptive entropy decoding, the apparatus comprising one or more electronic circuits configured to:
    receive coded data associated with a current block in a region, wherein the region corresponds to one or more rows of largest coding units (LCUs) and the coded data comprises a syntax element associated with a current luma intra mode of the current block;
    if a neighboring block of the current block is on an upper side of a horizontal boundary of the region or on a left side of a vertical boundary of the region, replace block information associated with the neighboring block by DC mode;
    determine information for parsing the syntax element based on the block information associated with the neighboring blocks; and
    perform context adaptive entropy decoding of the syntax element based on the determined information.

11. The apparatus of claim 10, wherein the context adaptive entropy decoding corresponds to CABAC (context adaptive binary arithmetic coding) decoding or CAVLC (context adaptive variable length coding) decoding.

12. The apparatus of claim 10, wherein the syntax element corresponds to luma intra mode, significant flag, last significant flag, coefficient greater than one, or coefficient magnitude minus one.

13. The apparatus of claim 12, wherein the replacement block information corresponds to DC mode or Planar mode when the syntax element corresponds to the luma intra mode.

14. The apparatus of claim 10, wherein the replacement block information corresponds to a pre-defined value, a user-defined value, a value that marked as unavailable, or the block information of a previously processed block in the region.

15. The apparatus of claim 14, wherein the previously processed block is a left block or a lower-left block of the current block.

16. The apparatus of claim 10, wherein the block information includes the syntax element to be processed by the context adaptive entropy decoding.

17. The apparatus of claim 10 wherein said one or more neighboring blocks correspond to one or more blocks selected from a group consisting of an above-left block, an above block, an above-right block, a left block and an above left block of the current block.

18. The apparatus of claim 10, wherein said one or more neighboring blocks correspond to an above block and a left block of the current block.

19. A non-transitory computer readable medium storing a computer-executable program, the computer-executable program, when executed, causing a decoder to perform the following steps:

receiving coded data associated with a current block in a region, wherein the region corresponds to one or more rows of largest coding units (LCUs) and the coded data comprises a syntax element associated with a current luma intra mode of the current block;

if a neighboring block of the current block is on an upper side of a horizontal boundary of the region or on a left side of a vertical boundary of the region, replacing block information associated with the neighboring block by DC mode;

determining information for parsing the syntax element based on the block information associated with the neighboring blocks; and performing context adaptive entropy decoding of the syntax element based on the determined information.

* * * * *